(12) United States Patent
Shinohara et al.

(10) Patent No.: US 11,125,928 B2
(45) Date of Patent: Sep. 21, 2021

(54) DISPLAY DEVICE

(71) Applicant: Omron Corporation, Kyoto (JP)

(72) Inventors: Masayuki Shinohara, Kyoto (JP);
Gouo Kurata, Kyoto (JP); Tsuyoshi Arai, Kyoto (JP); Norikazu Kitamura, Kyoto (JP); Yuto Mori, Kyoto (JP)

(73) Assignee: Omron Corporation, Kyoto (JP)

( * ) Notice: Subject to any disclaimer, the term of this patent is extended or adjusted under 35 U.S.C. 154(b) by 125 days.

(21) Appl. No.: 16/343,257

(22) PCT Filed: Nov. 22, 2017

(86) PCT No.: PCT/JP2017/042087
§ 371 (c)(1),
(2) Date: Apr. 18, 2019

(87) PCT Pub. No.: WO2018/168089
PCT Pub. Date: Sep. 20, 2018

(65) Prior Publication Data
US 2019/0317266 A1 Oct. 17, 2019

(30) Foreign Application Priority Data

Mar. 14, 2017 (JP) .............................. JP2017-049238

(51) Int. Cl.
*G02B 6/10* (2006.01)
*F21V 8/00* (2006.01)
*G02B 30/56* (2020.01)
(52) U.S. Cl.
CPC ........... *G02B 6/0038* (2013.01); *G02B 6/003* (2013.01); *G02B 6/0031* (2013.01);
(Continued)

(58) Field of Classification Search
CPC .... G02B 6/0038; G02B 6/003; G02B 6/0031; G02B 6/0036; G02B 6/0076; G02B 30/56; G02B 35/24; G03B 25/02
(Continued)

(56) References Cited

U.S. PATENT DOCUMENTS 5,727,107 A * 3/1998 Umemoto ............ G02B 6/0038
385/116
9,519,153 B2 * 12/2016 Robinson ............. G02B 6/0045
(Continued)

FOREIGN PATENT DOCUMENTS

CN 1416000 A 5/2003
CN 1497271 A 5/2004
(Continued)

OTHER PUBLICATIONS

Office Action issued in Chinese Application No. 201780062235.5; dated Oct. 27, 2020 (13 pages).
(Continued)

*Primary Examiner* — Audrey Y Chang
(74) *Attorney, Agent, or Firm* — Osha Bergman Watanabe & Burton LLP

(57) ABSTRACT

To make a displayed image clear. A display device emits image light reflected by a plurality of prisms (141) provided in a light guide plate (14) from a light exit surface (14*c*). The prism (141) has a reflective surface (141*a*) that reflects and emits the image light. The reflective surface (141*a*) is formed in a curved shape in a thickness direction of the light guide plate (14).

14 Claims, 14 Drawing Sheets

(52) U.S. Cl.
CPC ......... *G02B 6/0036* (2013.01); *G02B 6/0076* (2013.01); *G02B 30/56* (2020.01)

(58) Field of Classification Search
USPC .................. 385/146; 362/600, 623; 359/619
See application file for complete search history.

(56) References Cited

U.S. PATENT DOCUMENTS

| | | | |
|---|---|---|---|
| 2003/0058381 | A1 | 3/2003 | Shinohara et al. |
| 2004/0105157 | A1 | 6/2004 | Matsushita et al. |
| 2005/0068624 | A1 | 3/2005 | Schilling et al. |
| 2009/0059366 | A1 | 3/2009 | Imai |
| 2010/0157577 | A1* | 6/2010 | Montgomery ....... G02B 6/0018 362/97.2 |
| 2013/0258464 | A1 | 10/2013 | Imai |
| 2013/0258509 | A1 | 10/2013 | Imai |
| 2014/0268327 | A1 | 9/2014 | Dunn et al. |
| 2014/0376258 | A1 | 12/2014 | Wu et al. |
| 2015/0242943 | A1* | 8/2015 | Abovitz ............... G06K 9/6201 705/27.2 |
| 2016/0003990 | A1 | 1/2016 | Tsukahara et al. |
| 2017/0192239 | A1* | 7/2017 | Nakamura ......... G02B 27/0172 |
| 2017/0192244 | A1 | 7/2017 | Shinohara et al. |
| 2017/0343803 | A1* | 11/2017 | Tonar ..................... B60R 1/088 |

FOREIGN PATENT DOCUMENTS

| | | |
|---|---|---|
| CN | 1538913 A | 10/2004 |
| CN | 100343076 C | 10/2007 |
| CN | 102495475 A | 6/2012 |
| JP | 2007-11057 A | 1/2007 |
| JP | 2011-186332 A | 9/2011 |
| JP | 2011-232717 A | 11/2011 |
| JP | 2016-114929 A | 6/2016 |
| JP | 2016-180776 A | 10/2016 |
| WO | 2016006525 A1 | 1/2016 |

OTHER PUBLICATIONS

Office Action in counterpart Japanese Patent Application No. 2017-049238 dated Nov. 12, 2019 (4 pages).
International Search Report issued in Application No. PCT/JP2017/042087, dated Feb. 6, 2018 (2 pages).
Written Opinion issued in International Application No. PCT/JP2017/042087, dated Feb. 6, 2018 (9 pages).

* cited by examiner

DISPLAY DEVICE

TECHNICAL FIELD

The present invention relates to a display device capable of displaying an image formed in the air.

BACKGROUND ART

Conventionally, there is known an aerial display capable of displaying an image formed in the air without a display. For example, Patent Document 1 discloses a display device in which image display light emitted from a display element to a light guide is reflected by a plurality of reflective surfaces provided inside a substrate of the light guide and is output from an outgoing surface of the light guide.

PRIOR ART DOCUMENT

Patent Document

Patent Document 1: Japanese Unexamined Patent Publication No. 2011-186332 (published on Sep. 22, 2011).

SUMMARY OF THE INVENTION

Problems to be Solved by the Invention

However, in the display device disclosed in Patent Document 1, since the reflective surface is formed as a flat surface, depending on the position in the thickness direction of the light guide, aberration occurs at a position where an image is formed by the light reflected by the same reflective surface. As a result, the image displayed by the display device becomes unclear, which has been problematic.

One aspect of the present invention has been made in consideration of the above problem and has an object to provide a display device capable of making a displayed image clear.

Means for Solving the Problem

In order to solve the above problem, a display device according to one aspect of the present invention is a display device including a light guide plate. In the display device, image light is entered from an end face of the light guide plate, and the image light is emitted from a light exit surface of the light guide plate, the image light being reflected or refracted by each of a plurality of emission structure units provided on the light guide plate. The emission structure unit has an optical surface configured to reflect or refract and emit the image light. The optical surface is formed in a curved shape in a thickness direction of the light guide plate.

Effect of the Invention

According to one aspect of the present invention, there is exerted an effect that a displayed image can be made clear.

BRIEF DESCRIPTION OF THE DRAWINGS

FIG. 12(a) is a perspective view of the spatial region, and FIG. 12(b) is a view illustrating an example of the display region of the two-dimensional display.

MODE FOR CARRYING OUT THE INVENTION

First Embodiment

Hereinafter, a first embodiment of the present invention will be described in detail with reference to the drawings.

Configuration of Display Device 1A

Figure 1:
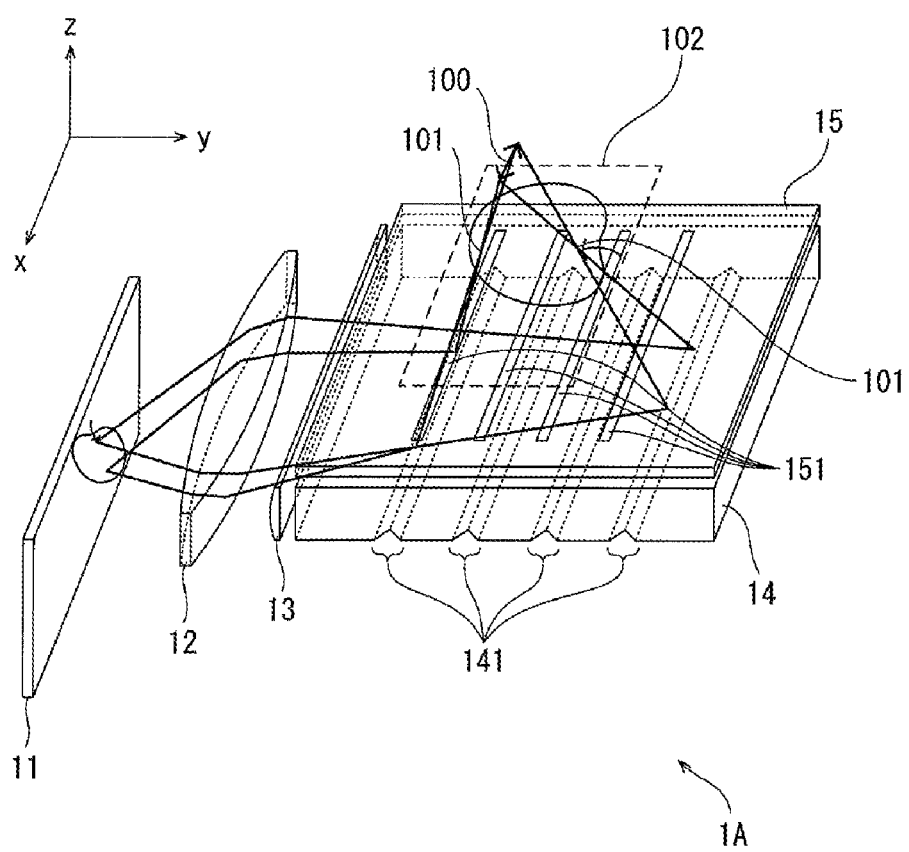
FIG. 1 is a pattern view illustrating an outline of a display device according to a first embodiment of the present invention.
Figure 2:
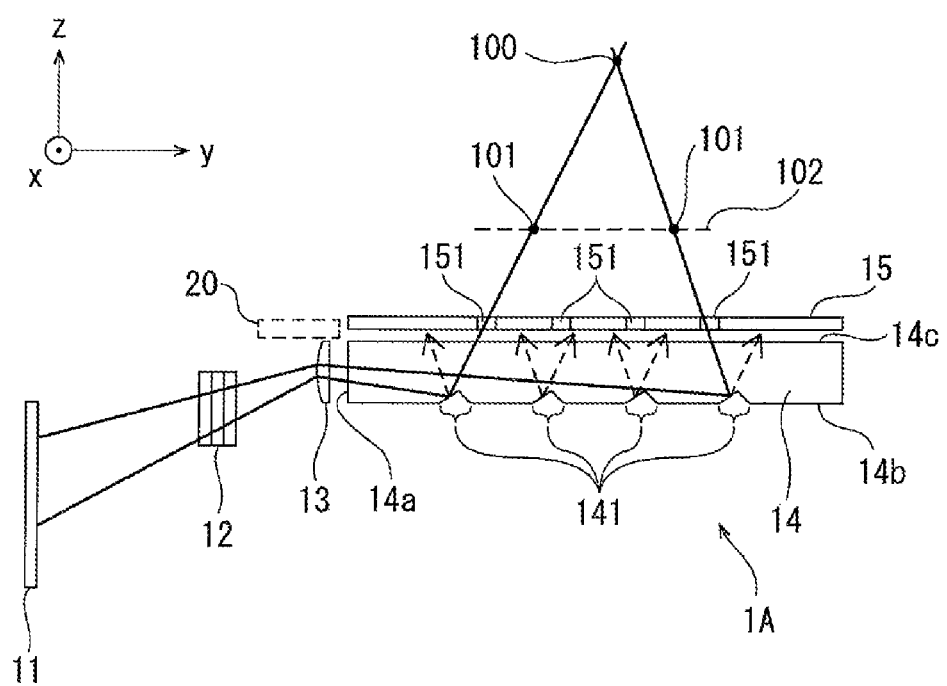
FIG. 2 is a side view illustrating the outline of the display device.
Figure 3:
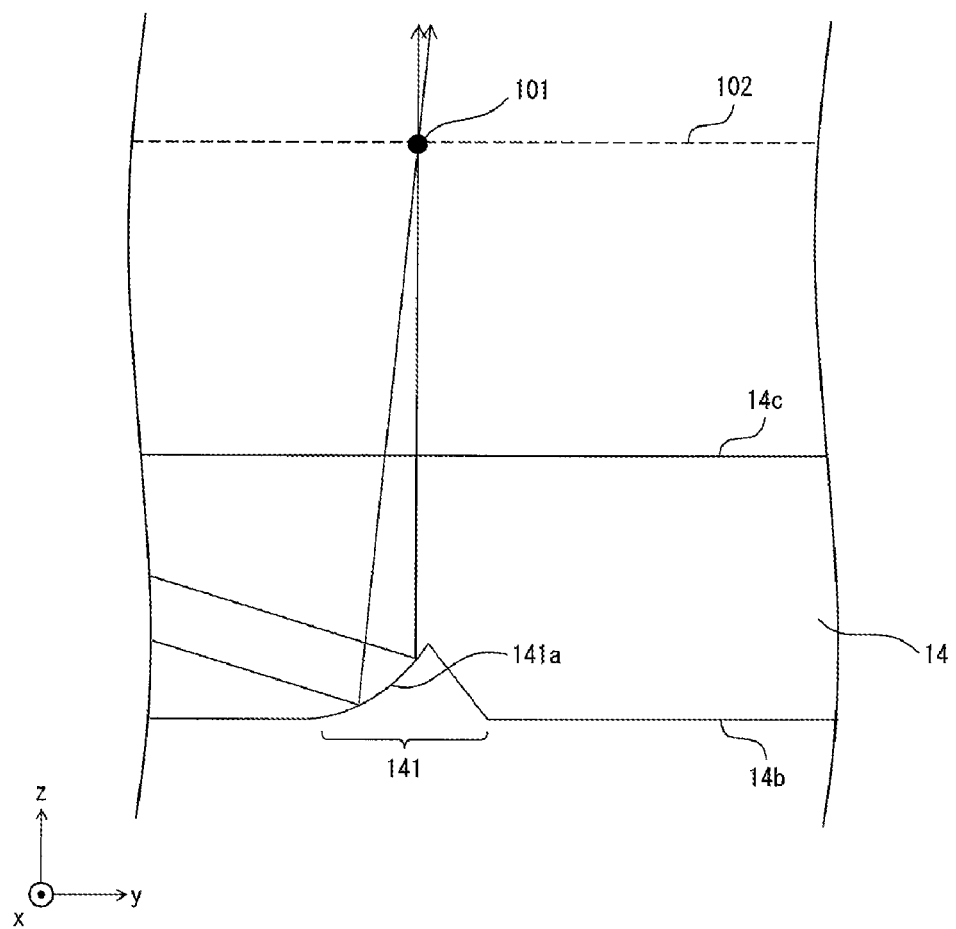
FIG. 3 is an enlarged side view of a light guide plate illustrating a state in which light is reflected by a prism provided in the display device.

An example of a main part configuration of the display device 1A in the present embodiment will be described with reference to FIGS. 1 to 4. FIG. 1 is a pattern view illustrating the outline of the display device 1A. FIG. 2 is a side view illustrating the outline of the display device 1A. FIG. 3 is an enlarged side view of a light guide plate 14 illustrating a state in which light is reflected by a prism 141.

As illustrated in FIGS. 1 to 3, the display device 1A includes an image display device 11, an imaging lens 12, a collimator lens 13, a light guide plate 14, and a mask 15. Note that the image display device 11, the imaging lens 12, the collimator lens 13, and the light guide plate 14 are arranged in order along the Y-axis direction. In addition, the light guide plate 14 and the mask 15 are arranged in this order along the Z-axis direction.

The image display device 11 displays a two-dimensional image projected in the air by the display device 1A in a display region in accordance with a video signal received from a control device (not illustrated). The image display device 11 is, for example, a general liquid crystal display capable of outputting image light by displaying an image in the display region. In the illustrated example, a display region of the image display device 11 and an incident surface 14a, which faces the display region, of the light guide plate 14 are both disposed so as to be parallel to an XZ plane. A bottom surface 14b on which the prism 141 described later is disposed, and a light exit surface 14c of the light guide plate 14 are disposed so as to be both parallel to the XY plane, the light exit surface 14c facing the bottom surface 14b and emitting light to the mask 15. Further, the surface of the mask 15, on which a slit 151 to be described later is provided, is also disposed so as to be parallel to the XY plane. Note that the display region of the image display device 11 and the incident surface 14a of the light guide plate 14 may be disposed so as to face each other, or the display region of the image display device 11 may be disposed so as to be inclined with respect to the incident surface 14a.

The imaging lens 12 is disposed between the image display device 11 and the incident surface 14a. The imaging lens 12 causes the image light output from the display region of the image display device 11 to converge in the XY plane parallel to the longitudinal direction of the incident surface 14a and then emits the converged light to the collimator lens 13. The imaging lens 12 may be of any kind so long as the image light can be converged. For example, the imaging lens 12 may be a bulk lens, a Fresnel lens, a diffractive lens, or the like. Further, the imaging lens 12 may be a combination of a plurality of lenses arranged along the Y-axis direction.

The collimator lens 13 is disposed between the image display device 11 and the incident surface 14a. The collimator lens 13 collimates the image light converged by the imaging lens 12 in the YZ plane orthogonal to the longitudinal direction of the incident surface 14a. The collimator lens 13 emits the collimated image light to the incident surface 14a of the light guide plate 14. Similarly to the imaging lens 12, the collimator lens 13 may be a bulk lens and a Fresnel lens. Note that the arrangement order of the imaging lens 12 and the collimator lens 13 may be reversed. Further, the functions of the imaging lens 12 and the collimator lens 13 may be realized by one lens or may be realized by a combination of many lenses. That is, any lens can be used for the combination of the imaging lens 12 and the collimator lens 13 so long as the image light output from the display region by the image display device 11 can be converged on the XY plane and collimated on the YZ plane.

The light guide plate 14 is made of a transparent member, receives the image light collimated by the collimator lens 13 on the incident surface 14a, and emits the image light from the light exit surface 14c. In the illustrated example, the light guide plate 14 has an outer shape of a rectangular parallelepiped formed in a flat plate shape, and a surface which faces the collimator lens 13 and is parallel to the XZ plane is defined as an incident surface 14a. A surface parallel to the XY plane and present on the negative direction side of the Z-axis is defined as the bottom surface 14b, and a surface parallel to the XY plane and facing the bottom surface 14b is defined as the light exit surface 14c. The light guide plate 14 includes a plurality of prisms (emission structure units) 141.

The plurality of prisms 141 reflect image light having entered from the incident surface 14a of the light guide plate 14. The prism 141 is provided on the bottom surface 14b of the light guide plate 14 so as to protrude from the bottom surface 14b toward the light exit surface 14c. When the propagation direction of the image light is in the Y-axis direction, for example, the plurality of prisms 141 are substantially triangular grooves arranged at predetermined intervals (e.g., 1 mm) in the Y-axis direction and having a predetermined width (e.g., 10 μm) in the Y-axis direction. The prism 141 has a reflective surface (optical surface) 141a that is a surface closer to the incident surface 14a with respect to the light guiding direction (+Y axis direction) of the image light among the optical surfaces of the prism 141. In the illustrated example, the plurality of prisms 141 are provided on the bottom surface 14b parallel to the X-axis. Accordingly, the image light having entered from the incident surface 14a and propagating in the Y-axis direction is reflected by the reflective surface 141a of each of the plurality of prisms 141 provided parallel to the X-axis that is orthogonal to the Y-axis. Each of the plurality of prisms 141 emits image light from the light exit surface 14c, which is one surface of the light guide plate 14, toward a predetermined viewpoint 100, the image light having been emitted from each of mutually different positions in the Z-axis direction orthogonal to the longitudinal direction of the incident surface 14a in the display region of the image display device 11. Details of the reflective surface 141a will be described later.

The mask 15 is made of a material opaque to visible light and has a plurality of slits 151. Among the light emitted from the light exit surface 14c of the light guide plate 14, only the light directed to the imaging point 101 on the plane 102 can be transmitted through the mask 15 by using each of the plurality of slits 151.

Each of the plurality of slits 151 transmits only the light directed to the imaging point 101 on the plane 102 among the light emitted from the light exit surface 14c of the light guide plate 14. In the illustrated example, the plurality of slits 151 are provided so as to be parallel to the X-axis. In addition, each of the individual slits 151 corresponds to any prism 141 of the plurality of prisms 141.

With the above configuration, the display device 1A forms an image, which is the image displayed on the image display device 11, on a virtual plane 102 outside the display device 1A, thereby projecting the image. Specifically, first, image light emitted from the display region of the image display device 11 passes through the imaging lens 12 and the collimator lens 13, and is then made incident on the incident surface 14a that is the end face of the light guide plate 14. Next, the image light having entered the light guide plate 14 propagates inside the light guide plate 14 and reaches the prism 141 provided on the bottom surface 14b of the light guide plate 14. The image light having reached the prism 141 is reflected by the reflective surface 141a of the prism 141 in the positive direction of the Z-axis and emitted from the light exit surface 14c of the light guide plate 14 which is disposed so as to be parallel to the XY plane. Among the image light emitted from the light exit surface 14c, image light having passed through the slit 151 of the mask 15 forms an image at the imaging point 101 on the plane 102. That is, image light emitted from each of the individual points in the display region of the image display device 11 is converged on the XY plane and collimated on the YZ plane, and thereafter, the image light can be projected at the imaging point 101 on the plane 102. By performing the above process for all the points in the display region, the display device 1A can project the image, output to the display region of the image display device 11, onto the plane 102. Hence, the user can visually recognize the image projected in the air when looking at the virtual plane 102 from the viewpoint 100. Although the plane 102 is a virtual plane on which the projected image is formed, a screen or the like may be disposed to improve the visibility.

In a case where the collimator lens 13 is disposed such that the center of the incident surface 14a and the optical axis of the collimator lens 13 coincide with each other in the Z-axis direction, the following problem might occur with the image projected onto the plane 102. That is, the light having been emitted from each of two points and entered the light guide plate 14 through the incident surface 14a has the same angle with respect to the bottom surface 14b, the two points being equidistant with respect to the Z-axis direction in the XZ plane orthogonal to the optical axis of the collimator lens 13. Hence, the light from each of the two points is reflected by the same prism 141 and goes to the plane 102. This causes a problem where these two points overlap from the viewpoint 100.

Therefore, the image display device 11 is preferably disposed such that the entire display region is positioned on the positive direction side or the negative direction side of the light guide plate 14 in the Z-axis direction. In the present embodiment, the entire display region of the image display device 11 is disposed on the negative direction side of the light guide plate 14. In this case, in order to increase the amount of light entering the light guide plate 14 from the image display device 11 via the collimator lens 13, a mirror 20 may be disposed in a position indicated by a dotted line in FIG. 2. It is preferable that the mirror 20 be disposed on the side opposite to the image display device 11 across the optical axis of the collimator lens 13 in the Z-axis direction and have a reflective surface that is parallel to the light exit surface 14c and directed to the image display device 11.

Further, as illustrated in FIG. 2, the image light emitted from the point on the negative direction side of the Z-axis in the display region of the image display device 11 is incident on a prism 141 positioned closer to the image display device 11 than the image light emitted from the point on the positive direction side of the Z-axis. The light is then reflected by the prism 141 and transmitted through the slit 151 corresponding to the prism 141.

Reflective Surface 141a

Next, the reflective surface 141a of the prism 141 in the present embodiment will be described in detail with reference to FIG. 3.

First, problems that arise when the reflective surface of the prism is flat will be described. In order to make the image displayed by the display device clear, light reflected by the same prism and reflected at every position in the height direction of the prism (i.e., the thickness direction of the light guide plate 14) is focused on the imaging point 101. However, when the reflective surface of the prism is flat, every light reaching the same prism and reflected by the prism cannot be focused on the imaging point 101. In other words, depending on the position in the height direction of the prism (i.e., the thickness direction of the light guide plate 14), the aberration occurs at the imaging positions on the plane 102 of the light reflected by the reflective surface of the prism. For this reason, the image displayed by the display device becomes unclear.

In order to solve this problem, the reflective surface 141a of the prism 141 in the present embodiment is formed in a curved shape in the thickness direction of the light guide plate 14. Specifically, as illustrated in FIG. 3, the reflective surface 141a is formed such that as the reflective surface 141a approaches the light exit surface 14c from the bottom surface 14b in the thickness direction of the light guide plate 14 (in other words, as the distance from the incident surface 14a increases), an angle formed with the light exit surface 14c (in other words, the bottom surface 14b) increases. It is thereby possible to focus every light reflected by the reflective surfaces 141a of the prisms 141 on the imaging point 101, irrespective of the position in the height direction of the prism 141 (i.e., the thickness direction of the light guide plate 14). As a result, the image displayed by the display device 1A can be made clear.

Figure 4:
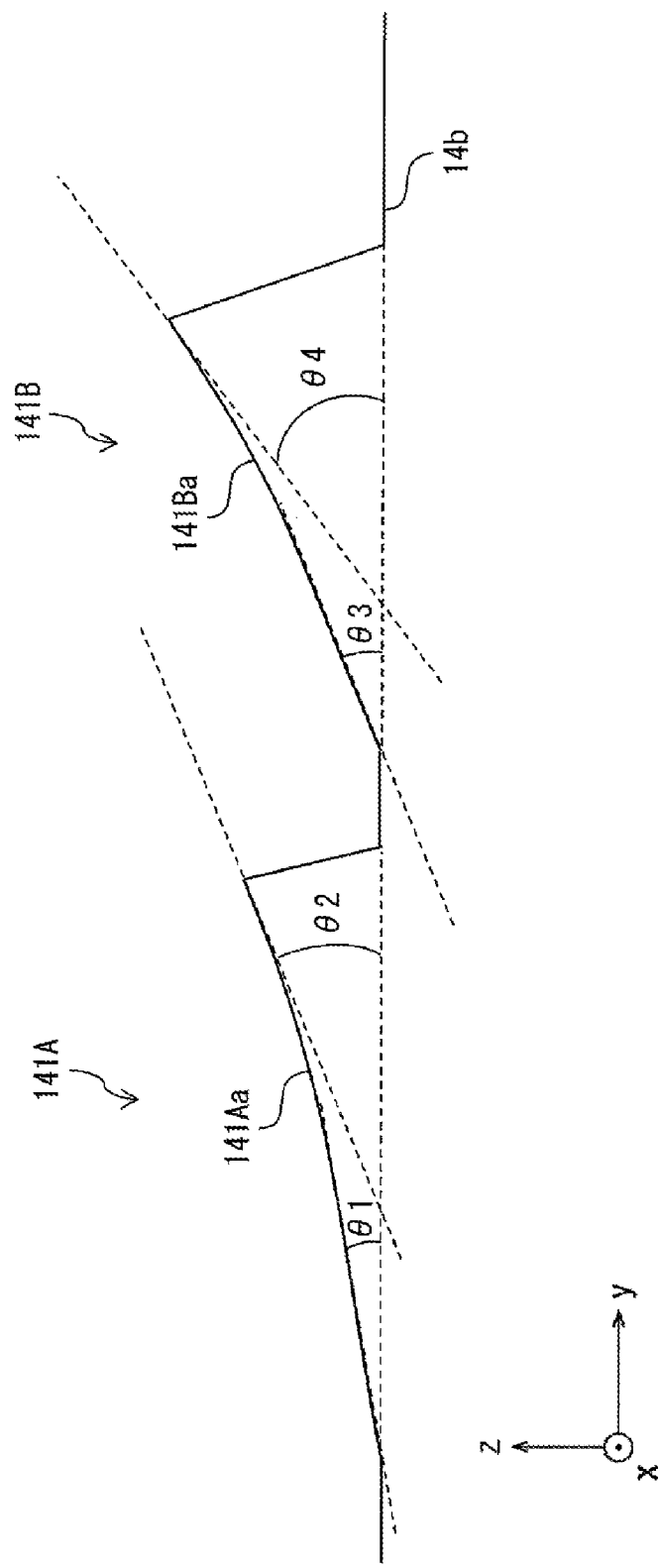
FIG. 4 is a view for explaining an angle formed between reflective surfaces of two arbitrary prisms adjacent to each other and the bottom surface of the light guide plate provided in the display device.

FIG. 4 is a view for explaining the angles between the bottom surface 14b (or the light exit surface 14c) and each of the reflective surfaces 141Aa, 141Ba of two arbitrary prisms 141 adjacent to each other (referred to as a prism 141A and a prism 141B from the side closer to the incident surface 14a). As illustrated in FIG. 4, it is assumed that the reflective surface 141Aa of the prism 141A forms an angle $\theta 1$ with the bottom surface 14b at the end on the incident surface 14a side with respect to the direction in which the image light is guided (+Y direction), and the reflective surface 141Aa forms an angle $\theta 2$ with the bottom surface 14b at the end on the side opposite to the end on the incident surface 14a side. Further, it is assumed that the reflective surface 141Ba of the prism 141B forms an angle $\theta 3$ with the bottom surface 14b at the end on the incident surface 14a side with respect to the direction in which the image light is guided (+Y direction), and the reflective surface 141Ba forms an angle $\theta 4$ with the bottom surface 14b at the end on the side opposite to the end on the incident surface 14a side. At this time, as described above, the reflective surface 141a is formed such that the angle formed with the light exit surface 14c (in other words, the bottom surface 14b) increases as the distance from the incident surface 14a increases, so that "angle $\theta 1$<angle $\theta 2$" and "angle $\theta 3$<angle $\theta 4$." In the present embodiment, "angle $\theta 2$=angle $\theta 3$." That is, the reflective surface 141a of each of the plurality of prisms 141 is formed such that the angle formed with the light exit surface 14c (in other words, the bottom surface 14b) increases as the distance from the incident surface 14a increases. Note that the angle $\theta 2$ may be smaller than the angle $\theta 3$.

In the above description, the light guide plate 14 has been configured to have the outer shape of the rectangular parallelepiped. However, the light guide plate 14 may be of any kind so long as having a configuration capable of emitting light incident on the incident surface 14a from the light exit surface 14c and forming an image at the imaging point 101 on the plane 102. For example, the light guide plate 14 may have a bent shape of the curved surface. At this time, the shapes, arrangement, and the like of the plurality of prisms 141 may be appropriately set on the light guide plate 14 such that the light can be formed at the imaging point 101. By forming the light guide plate 14 into the bent shape of the curved surface, the image light can be output using the light having propagated inside the bent light guide plate 14. As a result, the image light can be output in an arbitrary direction without being limited by the arrangement space and arrangement direction of the light guide plate 14. It is thereby possible to provide a display device with improved convenience.

The image light propagating inside the light guide plate 14 may propagate in any manner so long as the image light can enter each of the plurality of prisms 141 and be reflected by the reflective surface 141a of the reflective surface of the prism 141 and emitted from the light exit surface 14c. For example, the image light may propagate so as to be reflected twice or more on at least one of the light exit surface 14c and the bottom surface 14b and then emitted from the light exit surface 14c. Thereby, as compared with a configuration in which image light propagating inside the light guide plate 14 is not reflected or is reflected once by the light exit surface 14c and the bottom surface 14b, it is possible to increase the angle of the light with respect to the bottom surface 14b at the time of making the image light incident on the reflective surface 141a of the prism 141. As a result, it is possible to emit image light with high resolution from the light exit surface 14c in a wide range of the light guide plate 14.

Modified Example 1

Next, a light guide plate 24 as a modified example of the light guide plate 14 in the first embodiment will be described with reference to FIG. 5.

As illustrated in FIGS. 1 to 3, in the first embodiment, the description has been given of the configuration where the light guide plate 14 is made of a single member and the plurality of prisms 141 are formed on the bottom surface 14b so as to have a convex shape toward the inside of the light guide plate 14. However, in the display device of the present invention, any configuration may be formed so long as the image light can be reflected by the reflective surface 141a of each of the plurality of prisms 141 and emitted from the light exit surface 14c.

Figure 5:
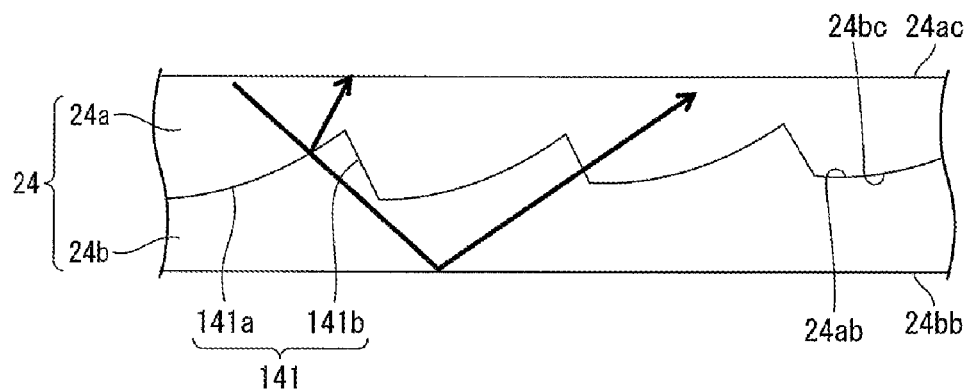
FIG. 5 is an outline view illustrating a configuration of a light guide plate as a modified example of the light guide plate provided in the display device.

FIG. 5 is an outline view illustrating the configuration of the light guide plate 24 in the present modified example. As illustrated in FIG. 5, the light guide plate 24 in the present modified example is made up of two light guide plates 24a, 24b.

In the light guide plate 24a, a light exit surface 24ac is flat, and a bottom surface 24ab is formed only of a combination of the reflective surface 141a and a preliminary surface 141b of the plurality of prisms 141. The light guide plate 24b has a shape in which a bottom surface 24bb is flat and the light exit surface 24bc is fitted with the bottom surface 24ab of the light guide plate 24a. The light guide plate 24a and the light guide plate 24b are joined so as to be fitted at the bottom surface 24ab of the light guide plate 24a. At this time, image light propagating inside the joined light guide plate 24 causes reflection or refraction at the boundary surface between the two light guide plates 24a, 24b. The illustrated example shows a case where the refractive indices of the two light guide plates are equal, and the image light transmitted through the boundary surface can be transmitted without refraction.

By adjusting the refractive index of the light guide plate 24a and the refractive index of the light guide plate 24b, it is possible to preset the ratios of reflection and refraction of the light at the boundary surface between the light guide plate 24a and the light guide plate 24b. This makes it possible to control, for example, an amount of light of an image formed on the plane 102.

Further, for example, when the refractive index of the light guide plate 24b is made larger than the refractive index of the light guide plate 24a, light having entered the light guide plate 24a from the light guide plate 24b can be reflected at the boundary surface. This makes it possible to prevent the generation of stray light due to light entering the light guide plate 24a from the bottom surface 24ab side of the light guide plate 24a. In addition, when the refractive index of the light guide plate 24b is made smaller than the refractive index of the light guide plate 24a, it is possible to reduce the deviation between a light guide angle (an angle formed with the bottom surface 14b or the light exit surface 14c) of light emitted from the light guide plate 24a and again entering the light guide plate 24a from the light guide plate 24b and a light guide angle of light guided through the light guide plate 24a. It is thereby possible to prevent the reduction in the resolution of the image to be formed.

Modified Example 2

In each of the above embodiments, the display device 1A has been configured to form an image with the image light transmitted through the slit 151 provided in the mask 15 among the image light emitted from the light exit surface 14c. However, the mask 15 and the slit 151 may not be provided so long as the image light can be formed at the imaging point 101 on the virtual plane 102. For example, when the light guide plate 14 includes a plurality of prisms 141 on the bottom surface 14b, a light absorption layer may be formed on the light exit surface 14c except for the position corresponding to each prism 141.

Modified Example 3

Next, a display device 1B as a modified example of the display device 1A in the first embodiment will be described with reference to FIG. 6.

In the display device 1A in the first embodiment, the light reflected by the prism 141 has been focused on the plane 102 to form a real image on the plane 102. In contrast, in the display device 1B in the modified example, a virtual image is formed on a plane 112 on the side opposite to the observer with respect to the light exit surface 14c of the light guide plate 14 with the light reflected by a prism 241.

Figure 6:
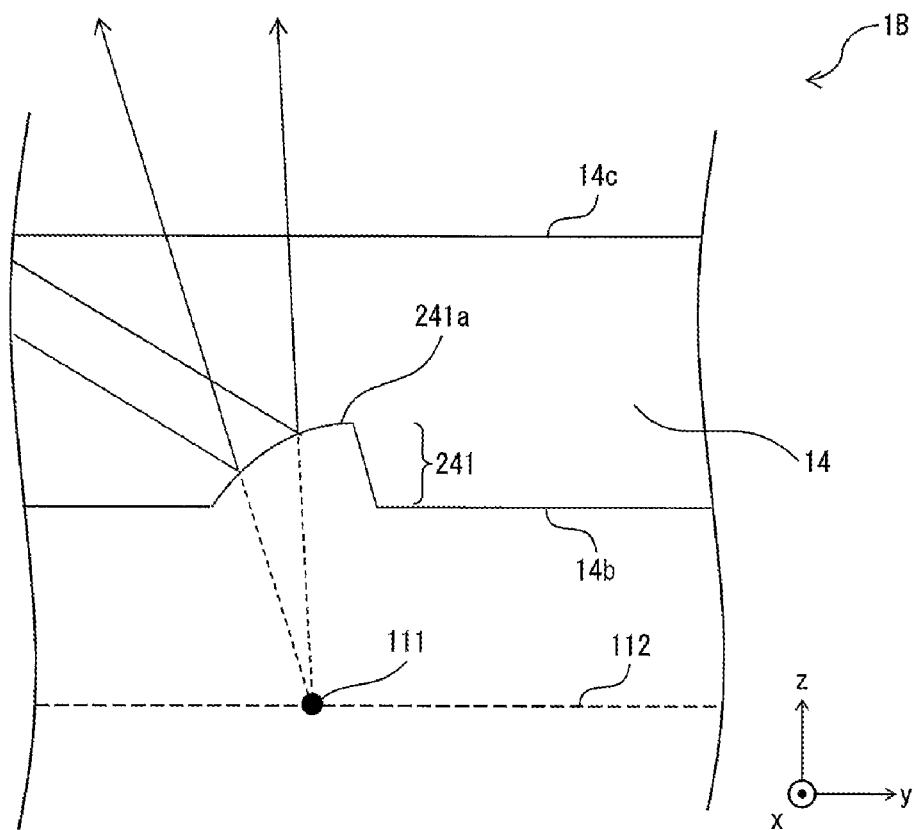
FIG. 6 is an enlarged side view of a light guide plate illustrating a state in which light is reflected by a prism provided in a display device as a modified example of the display device.

FIG. 6 is an enlarged side view of the light guide plate 14 illustrating a state in which light is reflected by the prism (emission structure unit) 241 provided in the display device 1B in the present modified example.

As illustrated in FIG. 6, in the display device 1B in the present modified example, the light guide plate 14 includes the prism 241 instead of the prism 141 in the first embodiment.

The prism 241 reflects the image light having entered from the incident surface 14a of the light guide plate 14. The prism 241 is provided on the bottom surface 14b of the light guide plate 14 so as to protrude from the bottom surface 14b toward the light exit surface 14c. The prism 241 has a reflective surface (optical surface) 241a which is a surface closer to the incident surface 14a with respect to the light guiding direction (+Y axis direction) of the image light, among the optical surfaces of the prism 241. Accordingly, the image light having entered from the incident surface 14a and propagating in the Y-axis direction is reflected by the reflective surface 241a of each of the plurality of prisms 241 provided parallel to the X-axis that is orthogonal to the Y-axis. Each of the plurality of prisms 241 emits image light from the light exit surface 14c, which is one surface of the light guide plate 14, toward the predetermined viewpoint 100, the image light having been emitted from each of mutually different positions in the Z-axis direction orthogonal to the longitudinal direction of the incident surface 14a in the display region of the image display device 11. In the display device 1B, the light reflected by each of the reflective surface 241a of each of the plurality of prisms 241 is emitted from the light exit surface 14c while appearing to be emitted from an imaging point 111 of the plane 112 on the side opposite to the observer with respect to the light exit surface 14c of the light guide plate 14. That is, a virtual image is formed on the plane 112 by the light reflected by each of the plurality of prisms 241. This enables the observer to visually recognize the stereoscopic image in the space on the side opposite to the observer with respect to the display device 1B.

The reflective surface 241a of the prism 241 in the present modified example has a curved shape in the thickness direction of the light guide plate 14. Specifically, as illustrated in FIG. 6, the reflective surface 241a is formed such that as the reflective surface 241a approaches the light exit surface 14c from the bottom surface 14b in the thickness direction of the light guide plate 14, an angle formed with the light exit surface 14c (in other words, the bottom surface 14b) decreases. It is thereby possible to make every light reflected by the reflective surfaces 241a of the prisms 241 appear to have been emitted from the imaging point 111 of the plane 112, irrespective of the position in the height direction of the prism 241 (i.e., the thickness direction of the light guide plate 14). As a result, the image (virtual image) displayed by the display device 1B can be made clear.

Second Embodiment

Another embodiment of the present invention will be described as follows. For the convenience of description, members having the same functions as the members described in the above embodiment are denoted by the same reference numerals, and the description thereof will be omitted.

A display device 1C in the present embodiment will be described with reference to FIGS. 7 to 9.

Figure 7:
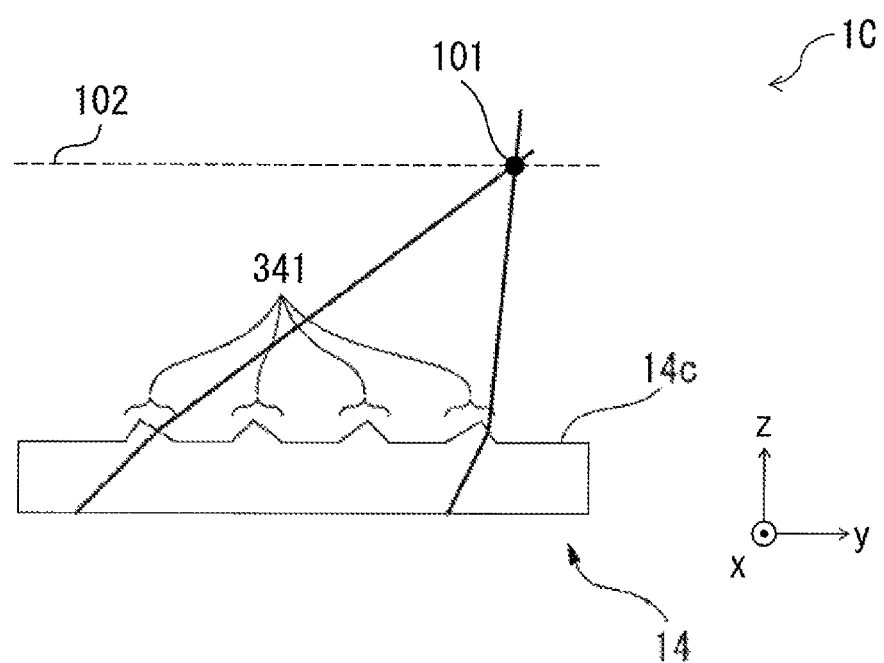
FIG. 7 is a side view illustrating an outline of a light guide plate of a display device according to a second embodiment of the present invention.

FIG. 7 is a side view illustrating the outline of the light guide plate 14 of the display device 1C. FIG. 8 is an enlarged side view of the light guide plate 14 illustrating a state in which light is refracted by a prism 341 included in the display device 1C.

Figure 8:
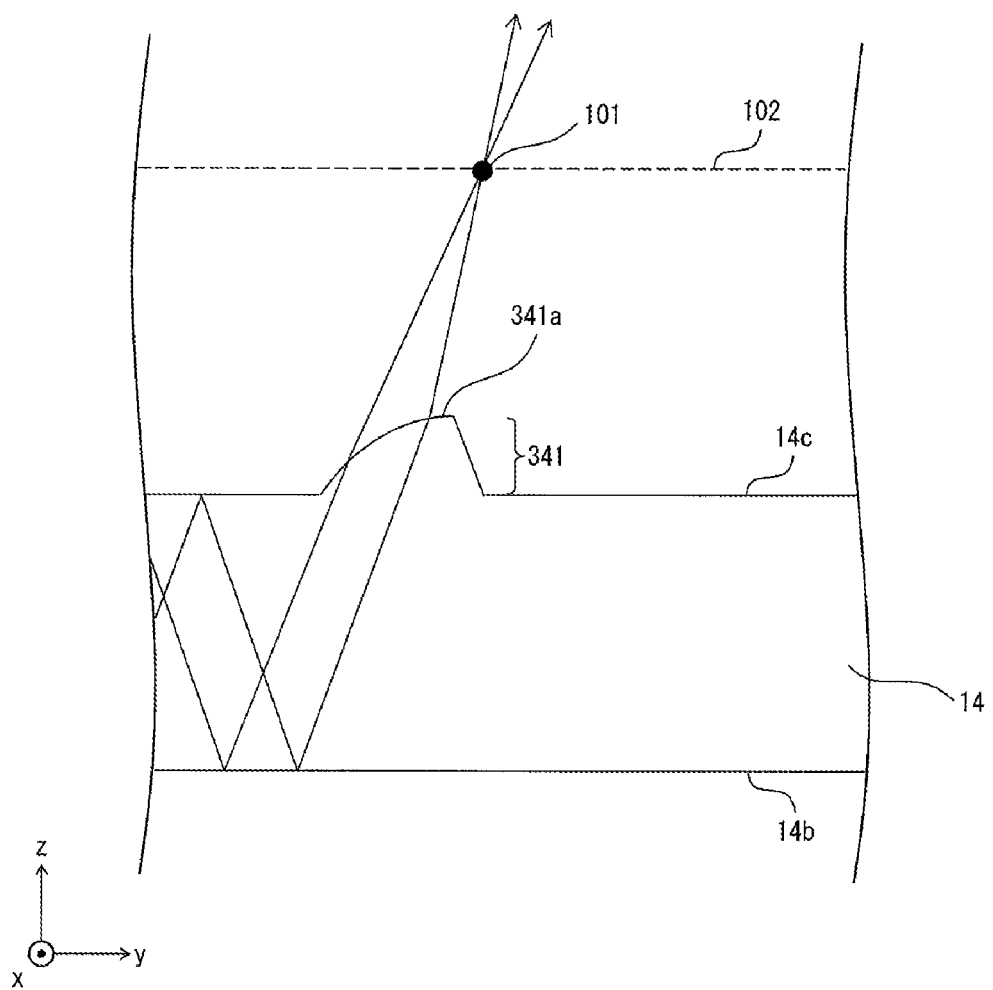
FIG. 8 is an enlarged side view of a light guide plate illustrating a state in which light is refracted by a prism provided in the display device.

As illustrated in FIGS. 7 and 8, in the display device 1C, a prism (emission structure unit) 341 is provided in place of the prism 141 in the first embodiment.

The prism 341 refracts the image light having entered from the incident surface 14a of the light guide plate 14. The prism 341 is provided on the light exit surface 14c of the light guide plate 14 so as to protrude from the light exit surface 14c toward the outside of the light guide plate 14 (toward +Z direction). When the propagation direction of the image light is in the Y-axis direction, for example, the plurality of prisms 341 are substantially triangular grooves arranged at predetermined intervals (e.g., 1 mm) in the Y-axis direction and having a predetermined width (e.g., 10 μm) in the Y-axis direction. The prism 341 has a refractive surface (optical surface) 341a which is a surface closer to the incident surface 14a with respect to the light guiding direction (+Y axis direction) of the image light, among the optical surfaces of the prism 341. In the illustrated example, the plurality of prisms 341 are provided on the light exit surface 14c parallel to the X-axis. Accordingly, the image light having entered from the incident surface 14a and propagating in the Y-axis direction is refracted by the refractive surface 341a of each of the plurality of prisms 341 provided parallel to the X-axis that is orthogonal to the Y-axis. Each of the plurality of prisms 341 emits image light from the light exit surface 14c, which is one surface of the light guide plate 14, toward a predetermined viewpoint 100, the image light having been emitted from each of mutually different positions in the Z-axis direction orthogonal to the longitudinal direction of the incident surface 14a in the display region of the image display device 11.

The display device 1C can form an image, which is the image displayed on the image display device 11, on a virtual plane 102 outside the display device 1C, thereby projecting the image. Specifically, first, image light emitted from the display region of the image display device 11 passes through the imaging lens 12 and the collimator lens 13, and is then made incident on the incident surface 14a that is the end face of the light guide plate 14. Next, the image light having entered the light guide plate 14 propagates inside the light guide plate 14 and reaches the prism 341 provided on the light exit surface 14c of the light guide plate 14. The image light having reached the prism 341 is refracted by the refractive surface 341a of the prism 341 in the positive direction of the Z-axis and emitted from the light exit surface 14c. Among the image light emitted from the light exit surface 14c, image light having passed through the slit 151 of the mask 15 forms an image at the imaging point 101 on the plane 102. That is, image light emitted from each of the individual points in the display region of the image display device 11 is converged on the XY plane and collimated on the YZ plane, and thereafter, the image light can be projected at the imaging point 101 on the plane 102. By performing the above process for all the points in the display region, the display device 1C can project the image, output to the display region of the image display device 11, onto the plane 102. Hence, the user can visually recognize the image projected in the air when looking at the virtual plane 102 from the viewpoint 100.

Refractive Surface 341a

Next, the refractive surface 341a of the prism 341 in the present embodiment will be described in detail with reference to FIG. 8.

The refractive surface 341a of the prism 341 in the present embodiment has a curved shape in the thickness direction of the light guide plate 14. Specifically, as illustrated in FIG. 8, the refractive surface 341a is formed such that as the refractive surface 341a is away from the light exit surface 14c in the thickness direction of the light guide plate 14 (in other words, as the distance from the incident surface 14a increases), an angle formed with the light exit surface 14c (in other words, the bottom surface 14b) decreases. It is thereby possible to focus every light refracted by the refractive surface 341a of the prisms 341 on the imaging point 101, irrespective of the position in the height direction of the prism 341 (i.e., the thickness direction of the light guide plate 14). This prevents the occurrence of aberration of the imaging position on the plane 102 of the refracted light generated in a case where the refractive surface of the prism is flat. As a result, it is possible to make the image displayed by the display device 1C clear.

Figure 9:
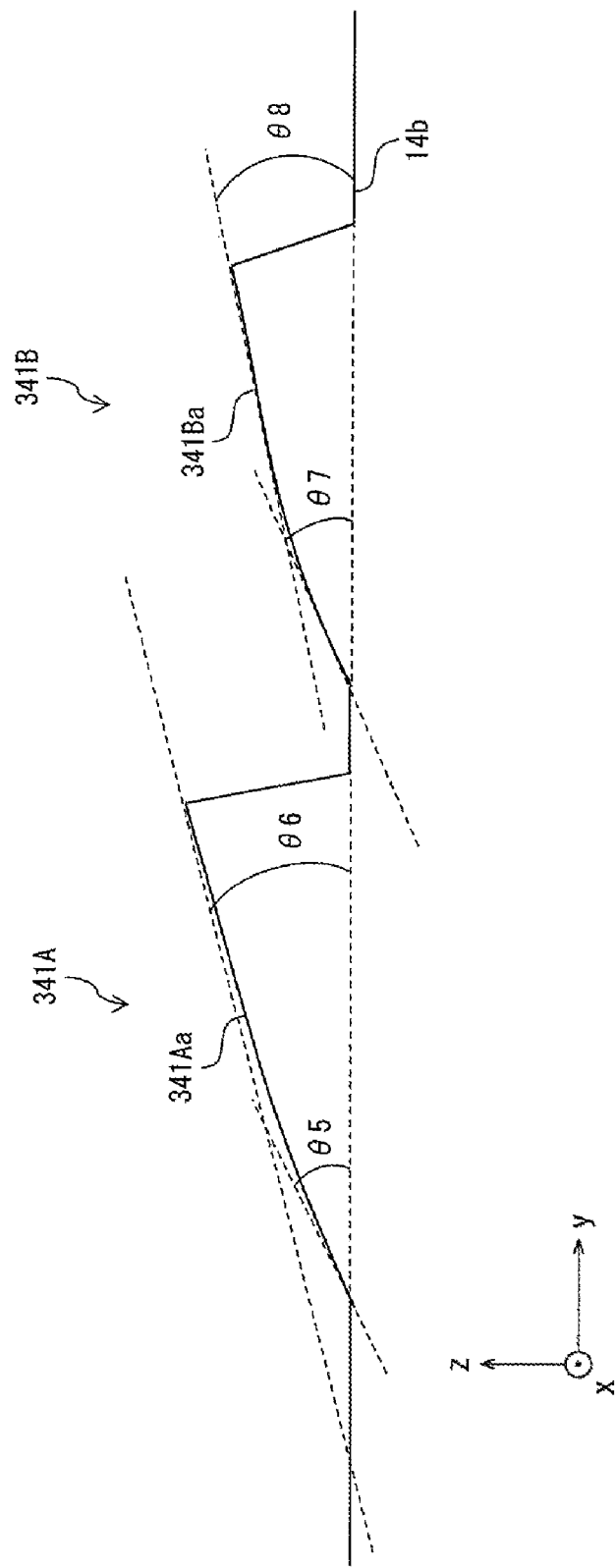
FIG. 9 is a view for explaining an angle formed between each of refractive surfaces of two arbitrary prisms adjacent to each other and a light exit surface of the light guide plate provided in the display device.

FIG. 9 is a view for explaining the angles between the light exit surface 14c and the respective refractive surfaces 341Aa, 341Ba of two arbitrary prisms 341 adjacent to each other (referred to as a prism 341A and a prism 341B from the side closer to the incident surface 14a). As illustrated in FIG. 9, it is assumed that the refractive surface 341Aa of the prism 341A forms an angle θ5 with the light exit surface 14c at the end on the incident surface 14a side with respect to the direction in which the image light is guided (+Y direction), and the refractive surface 341Aa forms an angle θ6 with the light exit surface 14c at the end on the side opposite to the end on the incident surface 14a side. Further, it is assumed that the refractive surface 341Ba of the prism 341B forms an angle θ7 with the light exit surface 14c at the end on the incident surface 14a side with respect to the direction in which the image light is guided (+Y direction), and the refractive surface 341Ba forms an angle θ8 with the light exit surface 14c at the end on the side opposite to the end on the incident surface 14a side. At this time, as described above, the refractive surface 341a is formed such that the angle formed with the light exit surface 14c decreases as the distance from the incident surface 14a increases), so that "angle θ5 >angle θ6" and "angle θ7 >angle θ8." In the present embodiment, "angle θ6=angle θ7." That is, the refractive surface 341a of each of the plurality of prisms 341 is formed such that the angle formed with the light exit surface 14c decreases as the distance from the incident surface 14a increases. Note that the angle θ6 may be larger than the angle θ7.

In the present embodiment, when the prism 341 is formed as illustrated in FIGS. 7 to 9, the image light emitted from the light exit surface 14c is the light refracted at the refractive surface 341a. The refractive index of the light in each member constituting the display device 1C generally varies depending on the temperature of the member. Hence, the position at which the image light refracted on the refractive surface 341a forms varies depending on the temperature of the prism 341. The display device 1C may thus have a configuration that can adjust the position of the slit 151 of the mask 15, for example, in accordance with the temperature of the prism 341.

Third Embodiment

Another embodiment of the present invention will be described as follows. For the convenience of description, members having the same functions as the members described in the above embodiment are denoted by the same reference numerals, and the description thereof will be omitted.

In the display device 1A in the first embodiment, a two-dimensional image is displayed. In contrast, a display device 1D in the present embodiment displays a three-dimensional image.

Figure 10:
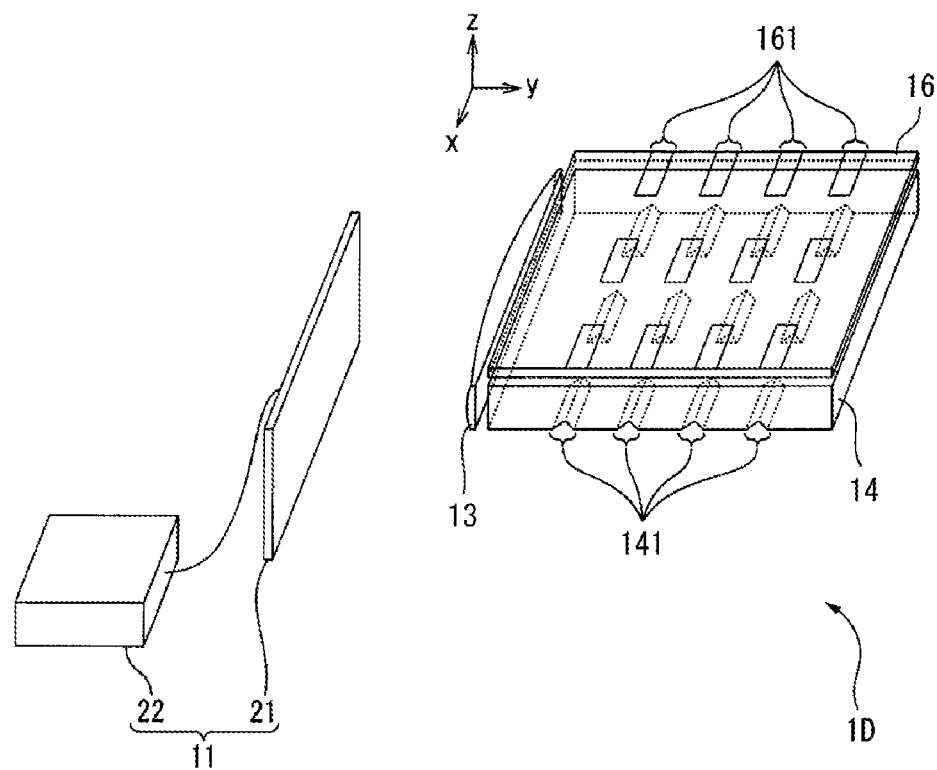
FIG. 10 is a schematic configuration view of a display device according to a third embodiment of the present invention.
Figure 11:
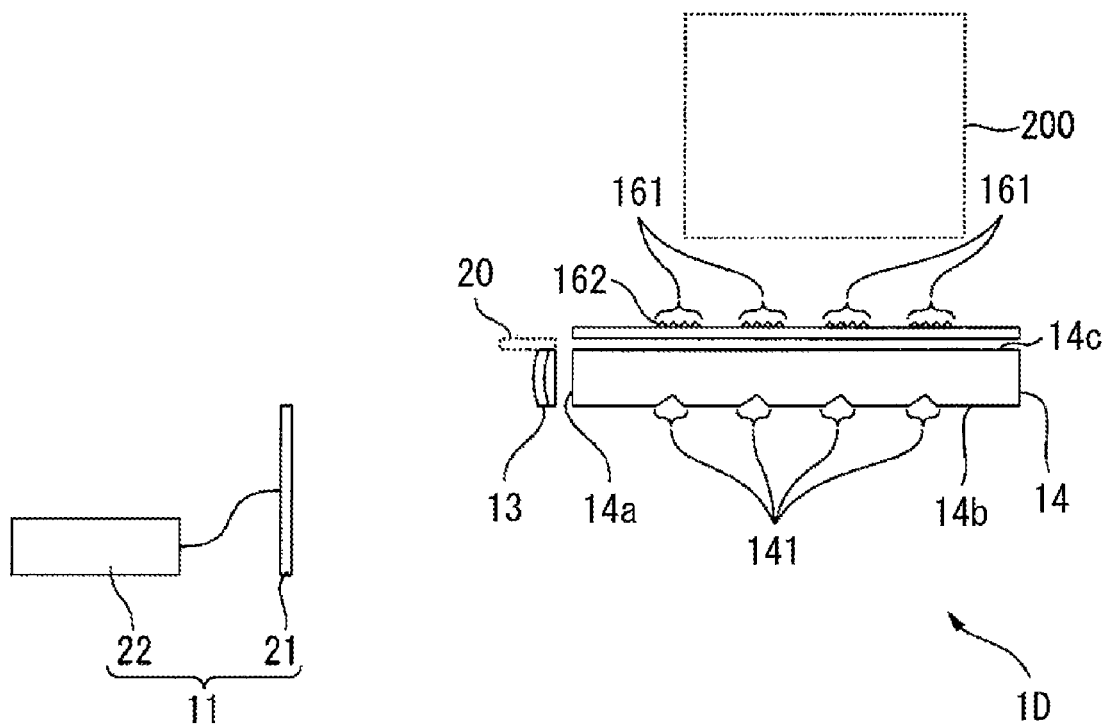
FIG. 11 is a schematic side view of the display device.

FIG. 10 is a schematic configuration view of the display device 1D. FIG. 11 is a schematic side view of the display device 1D. As illustrated in FIGS. 10 and 11, the display device 1D includes an image display device 11, a collimator lens 13, a light guide plate 14, and a prism array sheet (light deflector) 16. In the following description, the direction parallel to the longitudinal direction of the incident surface 14a of the light guide plate 14 is defined as the X-direction and the direction normal to the incident surface 14a is defined as the Y-direction in a plane parallel to the bottom surface 14b positioned on the rear surface side of the light guide plate 14. Further, the direction normal to the bottom surface 14b and the light exit surface 14c positioned on the front side of the light guide plate 14 is defined as the Z-direction.

The image display device 11 is an example of an image display unit, and includes, for example, a two-dimensional display 21 and a control device 22. The two-dimensional display 21 and the control device 22 are connected by a video cable.

The two-dimensional display 21 has, for example, a liquid crystal display or an organic electroluminescence (EL) display. A display region on the two-dimensional display 21 is divided into a plurality of blocks, and each block corresponds one-to-one with any one of a plurality of imaging points set in a spatial region 200 where a stereoscopic image is projected by the display device 1D. That is, the image of the object displayed on each block is projected at the imaging point in the spatial region 200 corresponding to the block by the display device 1D.

The control device 22 has, for example, one or a plurality of processors, a graphic board, a volatile or nonvolatile semiconductor memory circuit, and a communication interface for communicably connecting external equipment and a control device.

The control device 22 stores three-dimensional data of an object to be projected, or obtains three-dimensional data of the object from another equipment (not illustrated) via the communication interface. For example, the three-dimensional data of the object includes coordinate values for each point of the object in three-dimensional orthogonal coordinate system (hereinafter simply referred to as reference coordinate system) as a reference, information on color and luminance for each point, information on reference orientation (e.g., information represented by two reference points set in the object), and size information (e.g., vertical, horizontal, and depth sizes).

Based on the three-dimensional data of the object to be projected, the control device 22 displays the image of the object on the two-dimensional display 21 in a form in which the display device 1D can project a stereoscopic image of the object. For example, the control device 22 determines the size, orientation, and position of the stereoscopic image of the object in the spatial region in accordance with a control signal received from another device (not illustrated). Then, the control device 22 converts the coordinate value of each point of the object from the value of the reference coordinate system to a value of a three-dimensional orthogonal coordinate system (hereinafter simply referred to as spatial coordinate system) set in the spatial region by affine transformation such that the size, orientation, and position of the object become the determined values. Each coefficient of the affine transformation is calculated based on, for example, the coordinate value of the reference point, the orientation information, the size information, and corresponding information contained in a control signal, included in the three-dimensional data of the object.

Based on the coordinate value of each point of the object in the spatial coordinate system, the control device 22 identifies the point of the object corresponding to each of the individual imaging points in the spatial region when the object is projected in the spatial region. Then, the control device 22 refers the three-dimensional data of the object and the previously stored correspondence relationship between each imaging point and each block and displays, for each imaging point, an image of the point of the object at the imaging point in the corresponding block on the display region of the two-dimensional display 21. Note that the block may correspond to one pixel of the two-dimensional display 21 or may include a plurality of pixels continuous in at least one of the X-direction and the Z-direction.

Figure 12:
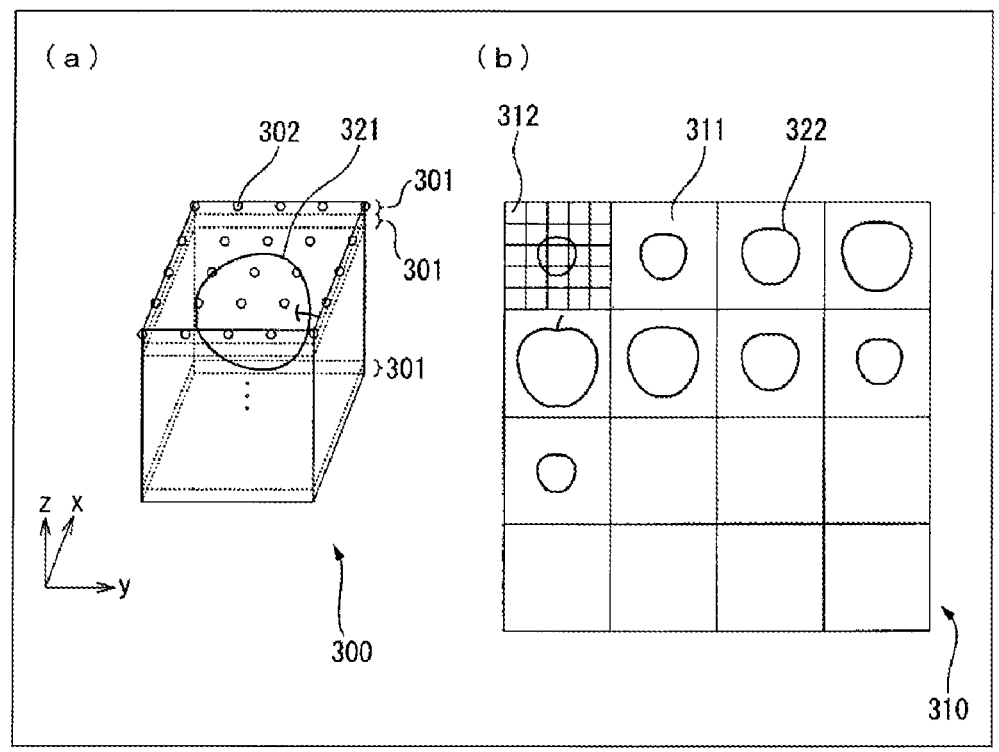
FIG. 12 illustrates an example of a correspondence relationship between each block set in a display region of a two-dimensional display provided in the display device and each imaging point in a spatial region where a stereoscopic image is projected.

FIGS. 12(a) and 12(b) each illustrate an example of a correspondence relationship between each block set in a display region 310 of the two-dimensional display 21 and each imaging point in a spatial region 300 where a stereoscopic image is projected: FIG. 12(a) is a perspective view of the spatial region 300, and FIG. 12(b) is a view illustrating an example of the display region 310 of the two-dimensional display 21.

As illustrated in FIG. 12(a), for example, the spatial region 300 has a size of 80 mm along the Z-direction, 125 mm along each of the X-direction and the Y-direction. The spatial region 300 is divided into 16 partial regions 301 along the Z-direction, and in each partial region 301, five imaging points 302 in each of the X-direction and the Y-direction, that is, a total of 25 imaging points 302 are set. FIG. 12(a) illustrates only the imaging point 302 for one partial region 301 for the sake of simplicity. On the other hand, as illustrated in FIG. 12(b), the display region 310 of the two-dimensional display 21 is divided into large blocks 311 in the number equal to the number of divisions in the Z-direction of the spatial region 300 (in this example, 4 (X-direction)×4(Z-direction)=16). Each of the plurality of large blocks 311 corresponds one-to-one with one of the partial regions 301. In the display region 310, the arrangement order of the large blocks 311 is arbitrary, and for example, the large blocks 311 are arranged in the raster scanning order, sequentially from the large block 311 corresponding to the partial region 301 closer to the observer in the spatial region 300.

Each large block 311 is divided into blocks 312 equal in number to the number of imaging points included in the corresponding partial region 301 (in this example, 5(X-direction)×5(Z-direction)=25). Each block 312 in each of the individual large blocks 311 corresponds one-to-one with one of the imaging points 302 in the partial region 301 in the spatial region 300 corresponding to the large block 311. Therefore, in each block 312, the image of the object to be projected at the corresponding imaging point 302 in the spatial region 300 may only be displayed. Although the arrangement order of the blocks 312 is arbitrary, each block 312 is arranged in the same order as the arrangement order of the imaging points 302 in the corresponding partial region 301, for example.

Therefore, when a stereoscopic image 321 of a predetermined object is projected in the spatial region 300, in each large block 311, a portion 322 of the stereoscopic image 321, which overlaps with the partial region 301 in the spatial region 300 corresponding to the large block 311, is displayed. Then, in each block 312 in each large block 311, an image of a portion in the portion 322, which corresponds to the block 312, may only be displayed.

Note that the control device 22 does not need to cause anything to be displayed in a block among the blocks 312, the block having no image of the object to be projected at the corresponding imaging point 302 among the blocks 312. Similarly, the control device 22 does not need to cause anything to be displayed in the block among the blocks 312, the block being where the corresponding imaging point 302 is positioned on the rear surface of the object as viewed from the observer's side.

Note that the above correspondence relationship is an example, and each block may be arranged in any way so long as each block set in the display region of the two-dimensional display 21 corresponds one-to-one with each of the individual imaging points in the spatial region where the stereoscopic image is projected.

In the display device 1D, the light emitted from each of the individual blocks on the display region of the two-dimensional display 21 and propagating through the light guide plate 14 is directed to the imaging point corresponding to that block by each prism 141 and a corresponding micro-prism 162 among a corresponding prism array 161 formed on a prism array sheet 16.

Figure 13:
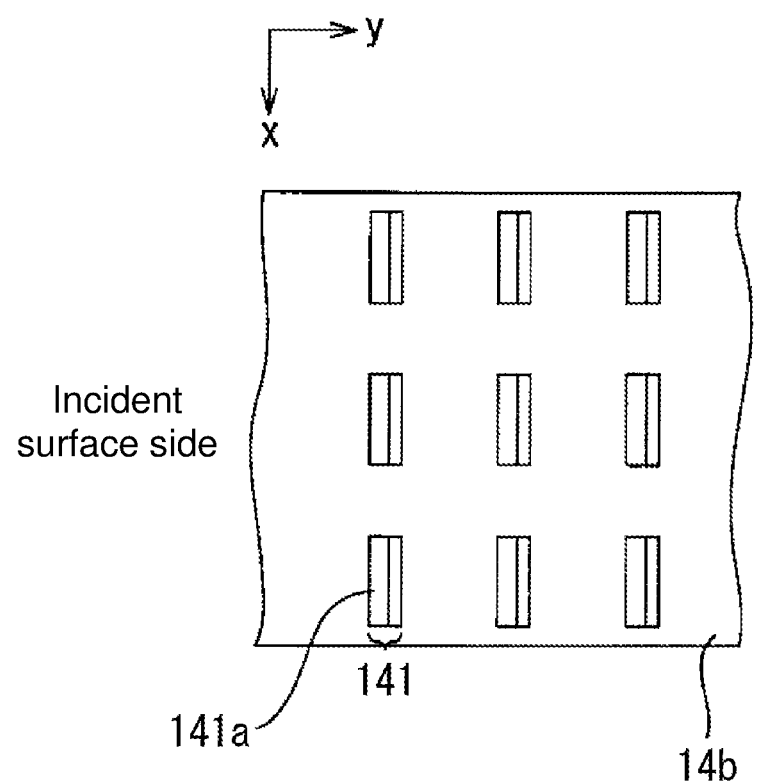
FIG. 13 is a partial enlarged view of the bottom surface of the light guide plate provided in the display device, viewed from the front side.

FIG. 13 is a partially enlarged view of the bottom surface 14b as viewed from the front side. In the present embodiment, a plurality of prisms 141 are arranged in a square lattice pattern at predetermined pitches (e.g., 2 mm) along the X-direction and the Y-direction, respectively. Each of the prisms 141 may be arranged in a zigzag manner. Each of the plurality of prisms 141 is extended in, for example, the X-direction, namely, along a direction substantially parallel to the longitudinal direction of the incident surface 14a, and has substantially triangular grooves each having a predetermined width (e.g., 10 μm) in the Y-direction.

The collimator lens 13 collimates the light having been emitted from each of the blocks on the display region of the two-dimensional display 21 of the image display device 11 and entered the light guide plate 14. Hence, the light forms an angle corresponding to the position of the block on the XZ plane with respect to the reflective surface 141a of the prism 141 is formed. Therefore, the light emitted from each of the individual blocks on the display region of the two-dimensional display 21 is emitted from the light exit surface 14c in a different direction in accordance with the position of the block on the XZ plane.

The prism array sheet 16 can be, for example, a sheet-like member formed of a material transparent to visible light. The prism array sheet 16 is disposed closer to the front side than the light exit surface 14c of the light guide plate 14. The prism array sheet 16 emits light from each of the individual blocks on the display region of the two-dimensional display 21 and directs the light emitted from the light exit surface 14c of the light guide plate 14 to the corresponding imaging point.

Figure 14:
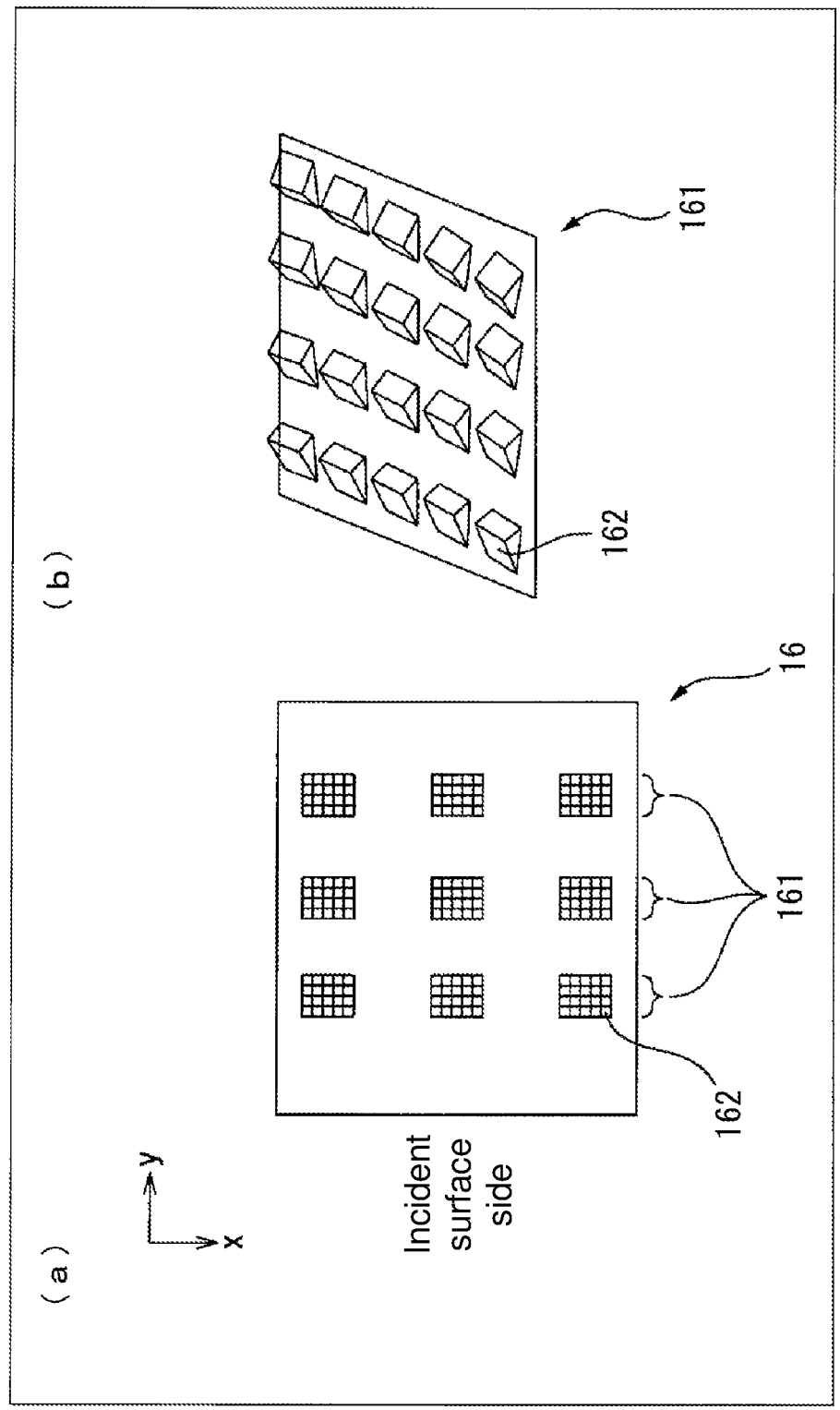
FIG. 14(a) is a schematic front view of a prism array sheet provided in the display device.
FIG. 14(b) is a schematic perspective view of one prism array of the prism array sheet.

FIG. 14(a) is a schematic front view of the prism array sheet 16, and FIG. 14(b) is a schematic perspective view of one prism array 161. The prism array sheet 16 has a plurality of prism arrays 161, and each of the individual prism arrays 161 corresponds one-to-one with any one of the plurality of prisms 141. In the present embodiment, since the plurality of prisms 141 are arranged in the square lattice pattern with predetermined pitches (e.g., 2 mm) in each of the X-direction and the Y-direction, the prism arrays 161 are also arranged in the X-direction and the Y-direction (e.g., 2 mm) in the square lattice pattern. Further, each of the individual prism arrays 161 has the same number of micro-prisms 162 as the number of blocks set in the display region of the two-dimensional display 21. Each of the individual micro-prisms 162 corresponds one-to-one with any one of the blocks set in the display region of the two-dimensional display 21. For example, when the display region is divided into 100 (X-direction)×100 (Z-direction) blocks, each prism array 161 emits 100 (X-direction)×100 (Y-direction) micro-prisms 162.

As described above, the light emitted from each of the individual blocks on the display region of the two-dimensional display 21 is collimated by the collimator lens 13. The light is then emitted from the light exit surface 14c toward a different direction in accordance with the position of the block on the XZ plane. Therefore, the light emitted from each of the individual blocks and emitted from the light exit surface 14c passes through a different position at the point of passing through the prism array sheet 16 in accordance with the position of the corresponding block in the XZ plane. Therefore, each of the individual micro-prisms 162 is formed with a predetermined size (e.g., 10 μm×10 μm) at a position where light from the corresponding block passes through the prism array sheet 16.

Each of the individual micro-prisms 162 direct the light from the corresponding block to the imaging point corresponding to that block. Thus, each of the plurality of micro-prisms 162 has, for example, a substantially triangular groove or as a substantially triangular protrusion as viewed from the side surface on one of the surface of the prism array sheet 16 on the side facing the light exit surface 14c and the surface on the observer's side. Each of the plurality of micro-prisms 162 has a refractive surface that refracts light from the block corresponding to the micro-prism 162 toward the corresponding imaging point. The angle of the refractive surface with respect to the light exit surface 14c is set in accordance with the refractive index of the material forming the prism array sheet 16 and the positional relationship between the direction of light incident on the micro-prism 162 from the corresponding block and the imaging point corresponding to the micro-prism 162.

Figure 15:
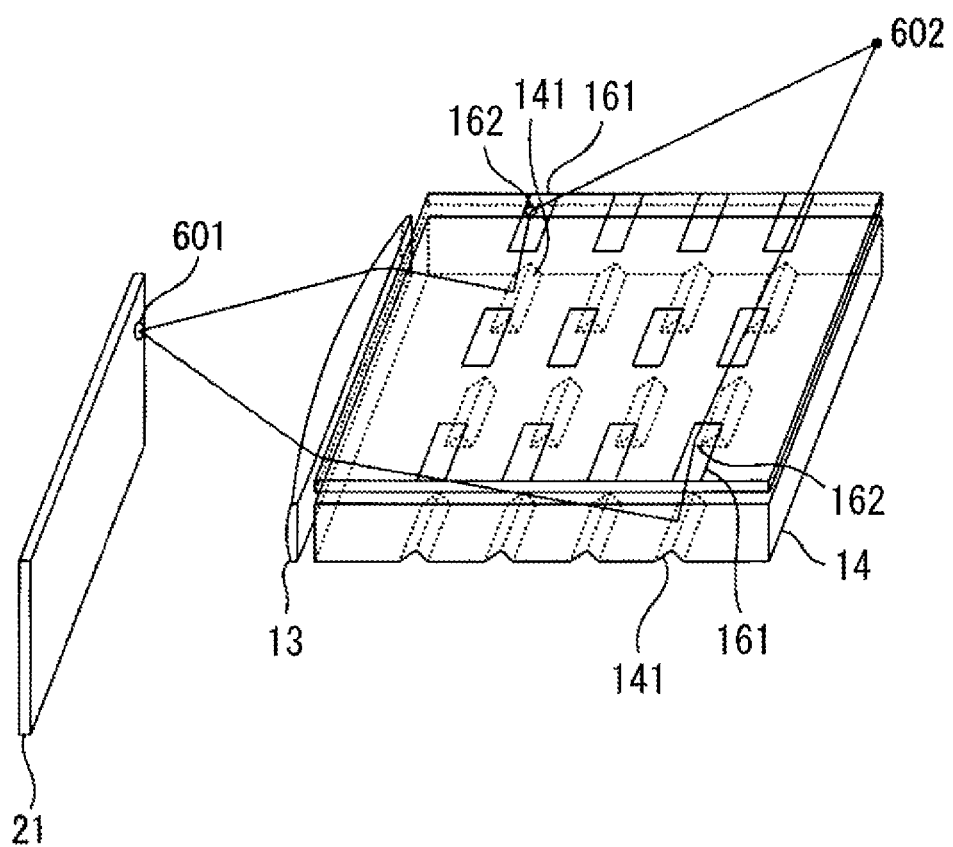
FIG. 15 is a view illustrating an example of a relationship between positions of blocks on the display region of the two-dimensional display and corresponding micro-prisms in the prism array.

FIG. 15 is a view illustrating an example of the relationship between the positions of the blocks on the display region of the two-dimensional display 21 and the corresponding micro-prisms 162 in each prism array 161. As illustrated in FIG. 15, light having been emitted from the block 601, collimated by the collimator lens 13, and entered the light guide plate 14 is emitted in the same direction by each prism 141. Therefore, the light is refracted toward the imaging point 602 by the micro-prism 162 at the same position in each prism array 161. As a result, light in a different direction from each prism array 161 gathers at the imaging point 602, so that the image displayed on the block 601 is projected at the imaging point 602.

As described above, the display device 1D collimates light emitted from each block corresponding to any of the imaging points 302 in the spatial region 300 where a stereoscopic image is projected, the block being on the display region 310 of the two-dimensional display 21 of the image display device 11. The display device 1D then causes the collimated light to enter the light guide plate 14, thereby converting the information on the position of the block into the direction of the light ray. In the display device 1D, each of the plurality of prisms 141 provided on the bottom surface 14b of the light guide plate 14 emits the light from each block in a different direction for each block. Then, in the display device D, the prism array 161 of the prism array sheet 16, which corresponds to each prism 141 of the light guide plate 14, directs the light from each block to the imaging point 302 corresponding to that block. Thus, the display device 1D can display a stereoscopic image of the object as a collection of light gathered at the imaging point 302 without using the projected object itself.

In the display device 1D in the present embodiment, similarly to the display device 1A in the first embodiment, the light guide plate 14 includes the prism 141. That is, the reflective surface 141a of the prism 141 is formed such that as the reflective surface 141a approaches the light exit surface 14c from the bottom surface 14b in the thickness direction of the light guide plate 14, an angle formed with the light exit surface 14c (in other words, the bottom surface 14b) increases. It is thereby possible to focus every light reflected by the reflective surfaces 141a of the prisms 141 on a predetermined imaging point on the prism array sheet 16, irrespective of the position in the height direction of the prism 141 (i.e., the thickness direction of the light guide plate 14). As a result, it is possible to make the image displayed by the display device 1D clear.

SUMMARY

A display device according to one aspect of the present invention is a display device including a light guide plate. In the display device, image light is entered from an end face of the light guide plate, and the image light is emitted from a light exit surface of the light guide plate, the image light being reflected or refracted by each of a plurality of emission structure units provided on the light guide plate. The emission structure unit has an optical surface configured to reflect or refract and emit the image light. The optical surface is formed in a curved shape in a thickness direction of the light guide plate.

With the above configuration, since the optical surface is formed in a curved shape in the thickness direction of the light guide plate, the image light reflected or refracted at an arbitrary point in the thickness direction of the light guide plate can be formed at a predetermined point on the optical surface. As a result, there is no aberration of the imaging position that occurs when the emission structure unit is flat. Accordingly, the displayed image can be made clear.

In the display device according to one aspect of the present invention, it may be configured such that the emission structure unit is provided on a bottom surface of the light guide plate, the surface facing the light exit surface, so as to protrude from the bottom surface toward the light exit surface, the optical surface is formed so that an angle formed with the light exit surface increases as approaching the light exit surface in a thickness direction of the light guide plate, and the image light is reflected by the optical surface to form a real image.

With the above configuration, since the optical surface is formed such that an angle formed with the light exit surface increases as approaching the light exit surface in a thickness direction of the light guide plate, it is possible to form a real image with the light reflected by the emission structure unit while not causing the aberration of the imaging position.

In the display device according to one aspect of the present invention, it may be configured such that an angle formed between the light exit surface and an end of the optical surface of the emission structure unit on a side farther from the end face in a direction in which the image light is guided by the light guide plate is equal to or smaller than an angle formed between the light exit surface and an end of the optical surface of each of adjacent emission structure units on a side closer to the end face in the direction in which the image light of the emission structure unit is guided by the light guide plate.

In the display device according to one aspect of the present invention, it may be configured such that the emission structure unit is provided on a bottom surface of the light guide plate, the bottom surface facing the light exit surface, so as to protrude from the bottom surface toward the light exit surface, the optical surface is formed so that an angle formed with the light exit surface decreases as approaching the light exit surface in a thickness direction of the light guide plate, and the image light is refracted by the optical surface to form a virtual image.

With the above configuration, since the optical surface is formed such that an angle formed with the light exit surface decreases as approaching the light exit surface in a thickness direction of the light guide plate, it is possible to form a virtual image with the light reflected by the emission structure unit while not causing the aberration of the imaging position.

In the display device according to one aspect of the present invention, it may be configured such that an angle formed between the light exit surface and an end of the optical surface of the emission structure unit on a side farther from the end face in a direction in which the image light is guided by the light guide plate is equal to or greater than an angle formed between the light exit surface and an end of the optical surface of each of adjacent emission structure units on a side closer to the end face in the direction in which the image light of the emission structure unit is guided by the light guide plate.

In the display device according to one aspect of the present invention, it may be configured such that the light guide plate is bent in a curved shape.

With the above configuration, it is possible to output the image light by using the light having propagated inside the bent light guide plate. As a result, it is possible to output the image light in an arbitrary direction without being limited by the arrangement space and arrangement direction of the light guide plate. It is thereby possible to provide a display device with improved convenience.

In the display device according to one aspect of the present invention, it may be configured such that the image light propagating inside the light guide plate is reflected twice or more by the light exit surface or the bottom surface facing the light exit surface and then emitted from the light exit surface.

With the above configuration, as compared with a configuration in which the time of reflection of the image light propagating inside the light guide plate by the light exit surface and the bottom surface is zero or one, when the image light is entered the emission structure unit, the angle with the bottom surface can be made larger. As a result, image light with high resolution can be emitted from the light exit surface in a wide range of the light guide plate.

In the display device according to one aspect of the present invention, it may be configured such that another light guide plate that has a shape fitted with the bottom surface of the light guide plate and is joined to the light guide plate.

With the above configuration, by adjusting the refractive index of the light guide plate and the refractive index of another light guide plate, the ratios of reflection and refraction of light at the boundary surface can be preset. It is thus possible to control the amount of light of the image formed on the plane, for example.

In the display device according to one aspect of the present invention, it may be configured such that a refractive index of another light guide plate is different from a refractive index of the light guide plate.

With the above configuration, when the refractive index of another light guide plate is made larger than the refractive index of the light guide plate, it is possible to prevent the generation of stray light due to light incident on the light guide plate from the bottom surface side of the light guide plate. In addition, when the refractive index of another light guide plate is made smaller than the refractive index of the light guide plate, it is possible to reduce the deviation between a light guide angle (an angle formed with the light exit surface) of light emitted from the light guide plate and again entering the light guide plate from another light guide plate and a light guide angle of light guided through the light guide plate. It is thereby possible to prevent the reduction in the resolution of the image to be formed.

A display device according to one aspect of the present invention is a display device further including: an image display device configured to output image light by displaying an image in a display region; a collimator lens disposed between the image display device and an incident surface of the light guide plate and configured to collimate the image light in a direction orthogonal to a longitudinal direction of the incident surface; and an imaging lens disposed between the image display device and the incident surface and configured to form an image with the image light at a predetermined position with respect to a direction parallel to the longitudinal direction of the incident surface. In the display device, each of the plurality of emission structure units emits light toward a predetermined viewpoint from the light exit surface being one surface of the light guide plate, the light being emitted from each of mutually different positions in a direction orthogonal to a longitudinal direction of the incident surface in the display region.

With the above configuration, it is possible to visually recognize the image formed by the image light emitted from the light exit surface at a predetermined viewpoint. That is, the display device can clearly display the image, displayed on the image display device, outside the display device.

A display device according to one aspect of the present invention is a display device further including: an image display device configured to display an image of an object, projected at each of a plurality of imaging points in a predetermined spatial region, in a block corresponding to the imaging point among the plurality of blocks formed by dividing a display region, for each of the plurality of imaging points in the predetermined spatial region; a collimator lens configured to convert light emitted from each of the plurality of blocks of the image display device into light directed in each of directions different from each other; and a light deflector disposed so as to face the light exit surface of the light guide plate, and configured to direct light from each of the plurality of blocks, the light being emitted from the light exit surface through the emission structure unit, toward a corresponding imaging point among the plurality of imaging points, for each of the plurality of emission structure units. In the display device, each of the plurality of emission structure units is provided on one of the light exit surface and the bottom surface facing the light exit surface, and light emitted from each of the plurality of blocks and entering from an incident surface of the light guide plate is emitted from the light exit surface toward a predetermined position of the light deflector.

With the above configuration, it is possible to project a stereoscopic image of the object clearly in the air without using the object itself to be projected.

The present invention is not limited to each of the embodiments described above, but can be subjected to various changes in the scope shown in the claims. An embodiment obtained by appropriately combining technical units disclosed respectively in different embodiments is also included in the technical scope of the present invention.

DESCRIPTION OF SYMBOLS 1A to 1D display device
11 image display device
12 imaging lens
13 collimator lens
14 light guide plate
14$a$ incident surface (end face)
14$b$, 24$ab$ bottom surface
14$c$, 24$ac$ light exit surface
141, 241, 341 prism (emission structure unit)
141$a$, 241$a$ reflective surface (optical surface)
15 mask
151 slit
16 prism array sheet (light deflector)
20 mirror
341$a$ refractive surface (optical surface)

The invention claimed is:

1. A display device comprising a light guide plate, wherein
image light is entered from an end face of the light guide plate, and the image light is emitted from a light exit surface of the light guide plate, the image light being reflected Of by each of a plurality of emission structure units provided on the light guide plate,
the emission structure unit has an optical surface configured to reflect and emit the image light,
the optical surface is formed in a curved shape in a thickness direction of the light guide plate,
the emission structure unit is provided on a bottom surface of the light guide plate, the bottom surface facing the light exit surface, so as to protrude from the bottom surface toward the light exit surface,
the optical surface is formed such that an angle formed with the light exit surface increases as approaching the light exit surface in a thickness direction of the light guide plate,
the image light is reflected by the optical surface to form a real image, and
an angle formed between the light exit surface and an end of the optical surface of the emission structure unit on a side farther from the end face in a direction in which the image light is guided by the light guide plate is smaller than an angle formed between the light exit surface and an end of the optical surface of each of adjacent emission structure units on a side further from the end face in the direction in which the image light of the emission structure unit is guided by the light guide plate.

2. The display device according to claim 1, wherein the light guide plate is bent in a curved shape.

3. The display device according to claim 1, wherein the image light propagating inside the light guide plate is reflected twice or more by the light exit surface or the bottom surface facing the light exit surface and then emitted from the light exit surface.

4. The display device according to claim 3, further comprising another light guide plate that has a shape fitted with the bottom surface of the light guide plate and is joined to the light guide plate.

5. The display device according to claim 4, wherein a refractive index of the other light guide plate is different from a refractive index of the light guide plate.

6. The display device according to claim 1, further comprising:
an image display device configured to output image light by displaying an image in a display region;
a collimator lens disposed between the image display device and an incident surface of the light guide plate and configured to collimate the image light in a direction orthogonal to a longitudinal direction of the incident surface; and
an imaging lens disposed between the image display device and the incident surface and configured to form an image with the image light at a predetermined position with respect to a direction parallel to the longitudinal direction of the incident surface,
wherein each of the plurality of emission structure units emits light toward a predetermined viewpoint from the light exit surface being one surface of the light guide plate, the light being emitted from each of mutually different positions in a direction orthogonal to a longitudinal direction of the incident surface in the display region.

7. The display device according to claim 1, further comprising:
an image display device configured to display an image of an object, where each of the image of the object is represented by a single imaging point of the plurality of imaging points and a block corresponds to the single imaging point of the plurality of imaging points such that the image is formed at each of a plurality of the imaging points in the block corresponding to the each of the plurality of imaging points among a plurality of the blocks, which are formed by dividing a display region and which correspond to the plurality of imaging points in a predetermined spatial region;
a collimator lens configured to convert light emitted from each of the plurality of blocks of the image display device into light directed in each of directions different from each other; and
a light deflector disposed so as to face the light exit surface of the light guide plate, and configured to direct light from each of the plurality of blocks, the light being emitted from the light exit surface through the emission structure unit, toward a corresponding imaging point among the plurality of imaging points, for each of the plurality of emission structure units,
wherein each of the plurality of emission structure units is provided on one of the light exit surface and the bottom surface facing the light exit surface, and
light emitted from each of the plurality of blocks and entering from an incident surface of the light guide plate is emitted from the light exit surface toward a predetermined position of the light deflector.

8. A display device comprising a light guide plate, wherein
image light is entered from an end face of the light guide plate, and the image light is emitted from a light exit surface of the light guide plate, the image light being refracted by each of a plurality of emission structure units provided on the light guide plate,
the emission structure unit has an optical surface configured to refract and emit the image light, the optical surface is formed in a curved shape in a thickness direction of the light guide plate,
the emission structure unit is provided on a bottom surface of the light guide plate, the bottom surface facing the light exit surface, so as to protrude from the bottom surface toward the light exit surface,
the optical surface is formed such that an angle formed with the light exit surface decreases as approaching the light exit surface in a thickness direction of the light guide plate,
the image light is refracted by the optical surface to form a virtual image, and
an angle formed between the light exit surface and an end of the optical surface of the emission structure unit on a side farther from the end face in a direction in which the image light is guided by the light guide plate is greater than an angle formed between the light exit surface and an end of the optical surface of each of adjacent emission structure units on a side further from the end face in the direction in which the image light of the emission structure unit is guided by the light guide plate.

9. The display device according to claim 8, wherein the light guide plate is bent in a curved shape.

10. The display device according to claim 8, wherein the image light propagating inside the light guide plate is reflected twice or more by the light exit surface or the bottom surface facing the light exit surface and then emitted from the light exit surface.

11. The display device according to claim 10, further comprising
another light guide plate that has a shape fitted with the bottom surface of the light guide plate and is joined to the light guide plate.

12. The display device according to claim 11, wherein a refractive index of the other light guide plate is different from a refractive index of the light guide plate.

13. The display device according to claim 8, further comprising:
an image display device configured to output image light by displaying an image in a display region;
a collimator lens disposed between the image display device and an incident surface of the light guide plate and configured to collimate the image light in a direction orthogonal to a longitudinal direction of the incident surface; and
an imaging lens disposed between the image display device and the incident surface and configured to form an image with the image light at a predetermined position with respect to a direction parallel to the longitudinal direction of the incident surface,
wherein each of the plurality of emission structure units emits light toward a predetermined viewpoint from the light exit surface being one surface of the light guide plate, the light being emitted from each of mutually different positions in a direction orthogonal to a longitudinal direction of the incident surface in the display region.

14. The display device according to claim 8, further comprising:
an image display device configured to display an image of an object, where each of the image of the object is represented by a single imaging point of the plurality of imaging points and a block corresponds to the single imaging point of the plurality of imaging points such that the image is formed at each of a plurality of the imaging points in the block corresponding to the each of the plurality of imaging points among a plurality of the blocks, which are formed by dividing a display region and which correspond to the plurality of imaging points, respectively, the plurality of imaging points constituting the image of the object projected in a predetermined spatial region;
a collimator lens configured to convert light emitted from each of the plurality of blocks of the image display device into light directed in each of directions different from each other; and
a light deflector disposed so as to face the light exit surface of the light guide plate, and configured to direct light from each of the plurality of blocks, the light being emitted from the light exit surface through the emission structure unit, toward a corresponding imaging point among the plurality of imaging points, for each of the plurality of emission structure units,
wherein each of the plurality of emission structure units is provided on one of the light exit surface and the bottom surface facing the light exit surface, and
light emitted from each of the plurality of blocks and entering from an incident surface of the light guide plate is emitted from the light exit surface toward a predetermined position of the light deflector.

* * * * *